April 25, 1944.  H. B. MEEKER  2,347,210
WASHER
Filed June 20, 1941
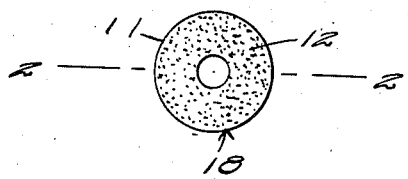
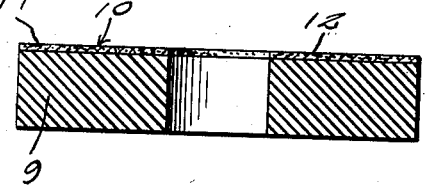
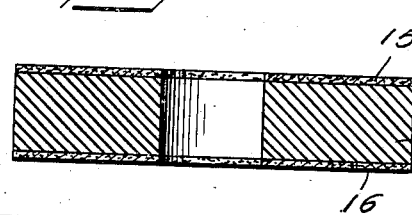
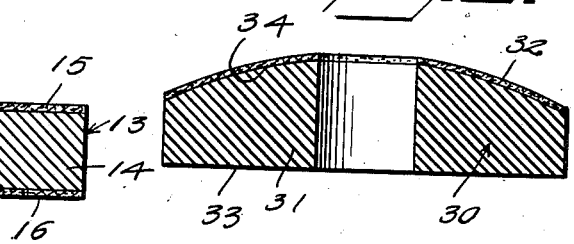
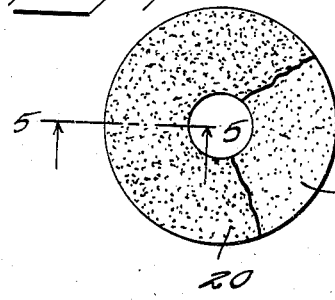
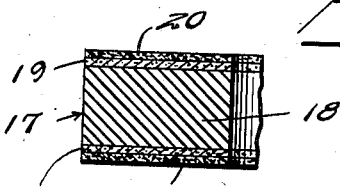
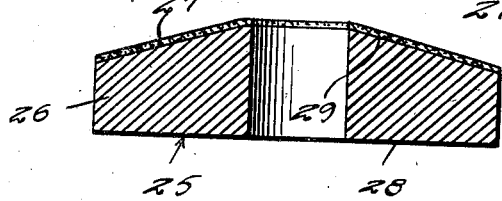
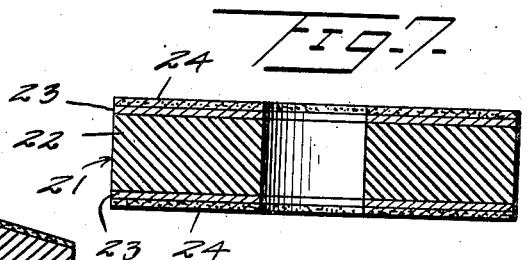
Inventor
H. B. Meeker
By Kimmel & Crowell
Attorneys Patented Apr. 25, 1944

2,347,210

UNITED STATES PATENT OFFICE 2,347,210

WASHER

Harry Beisher Meeker, Shickshinny, Pa.

Application June 20, 1941, Serial No. 399,027

3 Claims. (Cl. 51—195)

This invention relates to a combined abrading and sealing washer designed primarily for use in connection with the compression type valve or faucet used for controlling the flow of water, oil, air, gas or other fluids through pipes, but it is to be understood that a washer in accordance with this invention is for use in connection with any form of valve which it is found applicable.

The invention aims to provide, in a manner as hereinafter set forth, a washer for not only cleaning, smoothing and reconditioning a valve seat, but further acting as a new washer after the valve seat has been cleaned, smoothed and reconditioned.

The invention further aims to provide, in a manner as hereinafter set forth, a washer having as a part thereof an abrasive substance on one or both of its faces for the purpose aforesaid.

The invention further aims to provide, in a manner as hereinafter set forth, a washer having as a part thereof a removable abrasive substance on one or both of its faces for cleaning, smoothing and reconditioning a valve seat.

The invention further aims to provide, in a manner as hereinafter set forth, a washer of a construction for prolonging the life thereof, and to prevent leakage by utilizing it for the regrinding, truing and smoothing of a valve seat.

The invention further aims to provide, in a manner as hereinafter set forth, a washer having inherent means for regrinding, truing and smoothing a valve seat whereby leakage is prevented, and the life of the washer is prolonged.

The invention further aims to provide, in a manner as hereinafter set forth, a washer having removable abrasive means for regrinding, truing and smoothing a valve seat to prevent leakage.

The invention further aims to provide, in a manner as hereinafter set forth, a combined abrading and sealing washer for the purpose referred to whereby during the abrading action on the valve seat a similar action to some extent occurs on the face of the washer body bringing the washer and the valve seat in true alignment.

The invention further aims to provide, in a manner as hereinafter set forth, a washer for the purpose referred to which is simple in its construction and arrangement, strong, durable, compact, thoroughly efficient in its use, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein are shown embodiments of the invention, but it is to be understood that changes, variations and modifications may be resorted to which fall within the scope of the invention as claimed.

In the drawing:

Figure 1 is a top plan view of a combined abrading and sealing washer in accordance with this invention, Figure 2 is a section on line 2—2 of Figure 1 upon an enlarged scale, Figure 3 is a central diametrical section of a modified form of washer in accordance with this invention, Figure 4 is a top plan view of still another modified form of washer in accordance with this invention, Figure 5 is a section on line 5—5 of Figure 4 upon an enlarged scale, Figure 6 is a central diametrical section of still another modified form of washer in accordance with this invention, Figure 7 is a view similar to Figure 6 of still another modified form of washer in accordance with this invention, and Figure 8 is a central diametrical section of still another modified form of a washer in accordance with this invention.

With reference to Figures 1 and 2, the washer generally indicated at 8 consists of a composite body formed of a flat annular section 9 and a flat annular section 10 having its inner face removably secured by cementitious material against one face of the section 9. The sections 9 and 10 correspond in inner and outer diameters and their edges are flush with each other. The section 9 is what may be termed the body part of the washer and is formed of any suitable material, by way of example, fiber or Bakelite. The section 9 is of materially greater thickness than the section 10. The latter is formed of a thin carrier 11 of any suitable material, by way of example, paper, and has its outer face coated throughout with a suitable abrasive 12, by way of example, carborundum. It is to be understood, however, that section 10 may be in the form of an abrasive coating removably secured to and throughout one face of section 9.

With reference to Figure 3, there is shown a modified form of combined abrading and sealing washer 13 comprising a composite body formed of an inner section 14 and a pair of outer sections 15, 16 which are removably secured by cementitious material to opposite faces of the section 14. The latter corresponds in form to that of the section 9 of the washer 8. The section 15 corresponds in form to that of the section 10 of the washer 8. The section 16 corresponds in form to that of the section 10 of the washer 8. The sections 14, 15, 16 are of like inner and outer diameters and have their edges flush with each other. The section 14 is of materially greater thickness than the section 15 or the section 16. The sections 15, 16 preferably correspond in thickness. It is to be understood, however, that sections 15, 16 may be in the form of an abrasive coating removably secured to and throughout the oppostie faces of the section 14.

The modified form of combined abrading and sealing washer 17 illustrated by Figures 4 and 5 comprises a composite body formed of a central section 18, a pair of intermediate sections 19 and a pair of outer sections 20. Each of the said sections is in the form of an annulus. The inner and outer diameters of sections 18, 19, 20 correspond and the edges thereof are flush. The section 18 corresponds to the seat section 9 of the washer 8. The sections 19 and 20 correspond substantially in form to the section 10 of washer 8 with this exception, that the abrasive material of the sections 19 is finer than the abrasive material of the sections 20. The sections 19 are removably secured by cementitious material to the opposite faces of the section 18, and the sections 20 are removably secured by cementitious material upon the outer faces of the sections 19.

It is to be understood, however, that the sections 19 may be in the form of a fine abrasive coating removably secured to the faces of section 18 and that the sections 20 may be in the form of a coarse abrasive material removably secured upon the outer faces of the sections 19.

The modified form of combined abrading and sealing washer 21 illustrated by Figure 7 is of the same construction as that of the washer 17, with this exception, that the abrasive material of the intermediate and outer sections of washer 21 is of like form. The central, intermediate and outer sections of washer 21 are indicated at 22, 23 and 24, respectively.

The opposite faces of section 9 of washer 8, the opposite faces of section 14 of washer 13 and the opposite faces of the section 18 of washer 17 are flat.

With reference to the modified form of washer 25 shown by Figure 6, it consists of a section 26 and a section 27 removably secured against one face of section 26. The latter has one of its faces, indicated at 28, flat and its other face, indicated at 29, of frusto-conical form. The sections 26, 27 are of annular form, of like inner and outer diameters and have their edges flush. The section 27 has its inner face removably secured, by a suitable material, to the face 29 of section 26 and conforms in contour to that of said face 29. The section 26 is of materially greater thickness than the section 27 and is formed from material corresponding to the material of section 9 of washer 8. The section 27 is formed from material corresponding to the material of section 10 of washer 8.

The modified form of washer 30 shown by Figure 8 consists of a section 31 and a section 32 removably secured against one face of section 31. The latter has one of its faces indicated at 33 flat and its other face, indicated at 34 of convex curvature in cross section. The sections 31, 32 are of annular form, of like inner and outer diameters and have their edges flush. The section 32 has its inner face removably secured, by a suitable cementitious material, to the face 34 of section 31 and conforms in contour to said face 34. The section 31 is of materially greater thickness than the section 32 and is formed of material corresponding to the material of section 9 of washer 8. The section 32 is formed from material corresponding to the material of section 10 of washer 8.

The section 14 of washer 13, the section 18 of washer 17, the section 22 of washer 21, the section 26 of washer 25 and the section 32 of washer 30 constitute the body parts of such washers. The body parts of the several washers referred to provide a sealing means after the valve seat has been reground, trued and smoothed.

The several washers as referred to are of laminated form initially.

The purpose of the washer is to clean, smooth and recondition the valve seat and this is accomplished by action of the abrasive material on the valve seat on the turning of the faucet on and off a few times. During such operation the abrasive material is removed and the body part of the washer functions as a new faucet washer.

The advantages of the washer are to prolong the life of the latter and prevent leakage by regrinding, truing and smoothing the valve seat from the washer. In other words, the washer completes two functions, one a new washer and the other a renewed valve seat.

What I claim is:

1. A combined abrading and sealing washer for a faucet of the type having a valve seat for coaction with said washer; comprising a one-piece yieldable body part constituting a sealing member, an abrasive substance and an adhesive removably securing said abrasive substance directly to one face of said body, said one face constituting a sealing face upon removal of said abrasive substance.

2. A combined abrading and sealing valve for a faucet of the type having a valve seat for coaction with said valve; comprising a one-piece annular body, an abrasive substance and a cementitious material removably securing said abrasive substance directly to one face of said body, said one face constituting a sealing face upon removal of said abrasive substance.

3. A combined valve and valve grinder comprising a one-piece annular yieldable body, an abrasive substance and an adhesive removably securing said abrasive substance directly to one face of said body whereby said abrasive substance may be removed from said body, while in use, said one face constituting a sealing face upon removal of said abrasive substance.

HARRY B. MEEKER.